United States Patent
Lee

(10) Patent No.: US 9,656,565 B2
(45) Date of Patent: May 23, 2017

(54) METHOD AND APPARATUS FOR CANCELLING A CHARGE RESERVATION OF AN ELECTRIC VEHICLE

(71) Applicant: Hyundai Motor Company, Seoul (KR)

(72) Inventor: Seung Hwan Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 150 days.

(21) Appl. No.: 14/555,846

(22) Filed: Nov. 28, 2014

(65) Prior Publication Data

US 2016/0028262 A1    Jan. 28, 2016

(30) Foreign Application Priority Data

Jul. 28, 2014   (KR) .................. 10-2014-0095728

(51) Int. Cl.
| | | |
|---|---|---|
| H02J 7/00 | (2006.01) | |
| B60L 11/00 | (2006.01) | |
| B60L 11/18 | (2006.01) | |
| H01R 13/447 | (2006.01) | |
| H01R 13/70 | (2006.01) | |

(52) U.S. Cl.
CPC ....... *B60L 11/1838* (2013.01); *B60L 11/1818* (2013.01); *H01R 13/447* (2013.01); *H01R 13/701* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC .............................. H02J 7/0052; H02J 7/0073
USPC .................................... 320/155, 109; 701/22
See application file for complete search history.

(56) References Cited

U.S. PATENT DOCUMENTS

| | | | | |
|---|---|---|---|---|
| 8,610,401 | B2 * | 12/2013 | Kim | B60L 11/1838 |
| | | | | 180/65.1 |
| 9,071,070 | B2 * | 6/2015 | Ohnuki | H02J 7/007 |
| 9,136,727 | B2 * | 9/2015 | Takano | H01M 10/443 |
| 9,493,086 | B2 * | 11/2016 | Kinomura | B60L 11/1838 |
| 2010/0164439 | A1 * | 7/2010 | Ido | B60L 11/182 |
| | | | | 320/155 |
| 2010/0217485 | A1 * | 8/2010 | Ichishi | B60L 11/1824 |
| | | | | 701/36 |
| 2011/0022256 | A1 | 1/2011 | Asada et al. | |
| 2011/0050168 | A1 * | 3/2011 | Yoo | B60L 11/1844 |
| | | | | 320/109 |
| 2012/0081208 | A1 | 4/2012 | Lee | |

(Continued)

FOREIGN PATENT DOCUMENTS

| | | |
|---|---|---|
| JP | 2011-045231 A | 3/2011 |
| JP | 2012-147651 A | 8/2012 |

(Continued)

*Primary Examiner* — M'Baye Diao
(74) *Attorney, Agent, or Firm* — Mintz Levin Cohn Ferris Glovsky and Popeo, P.C.; Peter F. Corless

(57) ABSTRACT

A method and apparatus for controlling a charge of an electric vehicle are provided. The method includes generating, by a controller, a release command of the charging reservation based on a switch signal generated by operating a cover open/close switch. In addition, the controller is configured to change a setting of the charging inlet to a charging state based on the release command of the charging reservation in an opened state of a charging inlet cover.

17 Claims, 3 Drawing Sheets

(56) References Cited

U.S. PATENT DOCUMENTS

| | | | |
|---|---|---|---|
| 2012/0158229 A1* | 6/2012 | Schaefer | B60L 11/1842 701/22 |
| 2012/0161692 A1 | 6/2012 | Kobayashi et al. | |
| 2013/0110653 A1 | 5/2013 | Rivers, Jr. et al. | |
| 2014/0247019 A1* | 9/2014 | Park | B60L 11/185 320/160 |
| 2015/0046200 A1* | 2/2015 | Chihara | G07C 1/00 705/5 |
| 2015/0375633 A1* | 12/2015 | Masuda | B60L 11/1818 320/109 |
| 2016/0001667 A1* | 1/2016 | Masuda | B60L 11/14 320/109 |

FOREIGN PATENT DOCUMENTS

| | | |
|---|---|---|
| JP | 2012-186926 A | 9/2012 |
| JP | 2013-099246 A | 5/2013 |
| KR | 20-1998-0032894 | 9/1998 |
| KR | 20-1998-0034256 U | 9/1998 |
| KR | 10-1118899 | 3/2012 |

* cited by examiner

METHOD AND APPARATUS FOR CANCELLING A CHARGE RESERVATION OF AN ELECTRIC VEHICLE

CROSS-REFERENCE TO RELATED APPLICATION

This application is based on and claims priority from Korean Patent Application No. 10-2014-0095728, filed on Jul. 28, 2014, the disclosure of which is incorporated herein in its entirety by reference.

BACKGROUND

Field of the Invention

The present invention relates to a method and apparatus for controlling a charge of an electric vehicle, and more particularly, a method and apparatus for controlling a charge of an electric vehicle which intuitively cancels a charge reservation by utilizing a cover open/close switch around a charging inlet and provides an immediate charge via a charger, associated with the charger connecting action without a separate low relevance action or moving to the inside of the vehicle, even when the charging reservation is previously set.

Description of the Prior Art

A pure electric vehicle or a Plug-in Hybrid Vehicle (PHEV), which is operated by electricity generally, has a charging reservation function that charges the vehicle. The charging reservation function represents when the vehicle wakes up (e.g., no longer in an idle state) at a predetermined time without user manipulation and enables the charging of the vehicle to start. Further, the charging reservation function may be used as a managing method capable of reducing a cost of charging the vehicle by performing the charge using midnight electricity (e.g., a time when electricity is less expensive than electricity at another time). However, when the user desires to immediately charge the vehicle and the charging reservation is not canceled, electric power may not be transmitted from the charger to the battery of the vehicle and the vehicle may not be charged.

In particular, conventional methods for canceling a charging reservation of a vehicle may include entering a vehicle and pressing a cancel button for the charging reservation, finding a reservation setting page within a mounted Audio Video Navigation (AVN) screen and turning the function off, or pressing a button of a wireless smart key for a substantial amount of time. However, these methods of the related art may not be convenient for a driver to use. The connection of a charger to a vehicle, operation of a button of a smart key, entrance into a vehicle, and performance of a separate operation may be seen as an additional required action not associated with the charging of a vehicle.

SUMMARY

An objective of the present invention provides a method and apparatus for controlling a charge of an electric vehicle, which may intuitively cancel a charge reservation by utilizing a cover open/close switch around a charging inlet capable of identifying a charger connection and to provide an immediate charge using a charger, even when the charging reservation is previously set.

First, an exemplary embodiment of the present invention provides a method for controlling a charge of an electric vehicle that may include: generating, by a controller, a release command of the charging reservation based on a switch signal generated by operating a cover open/close switch; and adjusting, by the controller, a setting of the charging inlet to a charging state based on the release command of the charging reservation within an open state of a charging inlet cover. Within the method for controlling a charge of an electric vehicle, when an external charger is connected to the charging inlet, the battery of the electric vehicle may be temporally charged.

The method may further include: generating, by the controller, a maintaining command of the charging reservation based on a switch signal generated by operating the cover open/close switch once again; and returning, by the controller, the charging inlet to a non-charging state (e.g., preventing charging state) based on the maintaining command of the charging reservation. The cover open/close switch may include a switch that toggles (e.g., switches between) an on or off of the generation of the switch signal or a switch that has a contact position for on or off of the generation of the switch signal based on the operation.

The charging inlet cover may include a cover separated from a fastening part of the cover open/close switch and may be directly opened based on a button operation within the vehicle or a screen operation of a terminal, or a cover opened when an electronic door lock state of the charging inlet cover is released based on a corresponding operation and the charging inlet cover is separated from the fastening part of the cover open/close switch based on pressing the charging inlet cover by a user. On a back side of the charging cover or a vehicle wall surface around the charging inlet within the charging cover, an operation guide for operating the cover open/close switch may be included.

The apparatus for controlling a charge of an electric vehicle according to another aspect of the present invention may include: a cover open/close controller configured to separate and open a charging inlet cover from a cover open/close switch; and a reservation changer configured to receive a switch signal generated by an operation of the cover open/close switch and generate a release command of a charging reservation of the electric vehicle. A setting of the charging inlet by the charging reservation may be changed from a non-charging state to a charging state when the release command is generated and the charging cover is open. An external charger may be connected to the charging inlet, and temporally, in the charging state of the charging inlet, the battery of the electric vehicle may be charged.

The reservation changer may be configured to generate a maintaining command of the charging reservation based on a switch signal generated by operating the cover open/close switch once again, and the setting of the charging inlet may be returned to the non-charging state based on the maintaining command of the charging reservation. The cover open/close switch may include a switch that toggles an on or off state of the generation of the switch signal or a switch that has a contact position for on or off operation of the generation of the switch signal based on the operation.

The charging inlet cover may include a cover separated from a fastening part of the cover open/close switch and directly opened based on a button operation within the vehicle or a screen operation of a terminal, or a cover in which an electronic door lock state of the charging inlet cover with vehicle doors releases based on a corresponding operation and the charging inlet cover is separated from the fastening part of the cover open/close switch is opened based on the pressing the charging inlet cover by a user. On a back side of the charging cover or a vehicle wall surface around the charging inlet inside of the charging cover, an operation guide (e.g., operation instructions) for operating the cover open/close switch may be included.

The apparatus for controlling a charge of an electric vehicle may further include a charging reservation device configured to control a state change for charging a battery of the electric vehicle via an external charger connected to the charging inlet by switching the setting of the charging inlet from the non-charging state to the charging state, based on an input of the charging reservation.

According to exemplary embodiments of the present invention, a method and apparatus for controlling a charge of an electric vehicle may identify and cancel the charging reservation by utilizing a cover open/close switch near a charging inlet without a separate additional switch. In addition, the charging reservation may be more simply and conveniently canceled. Immediate charging of the vehicle using a charger may also be provided more conveniently. Further, since a separate switch may be omitted a charging reservation, an interior design of the vehicle may be simplified and not be limited.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
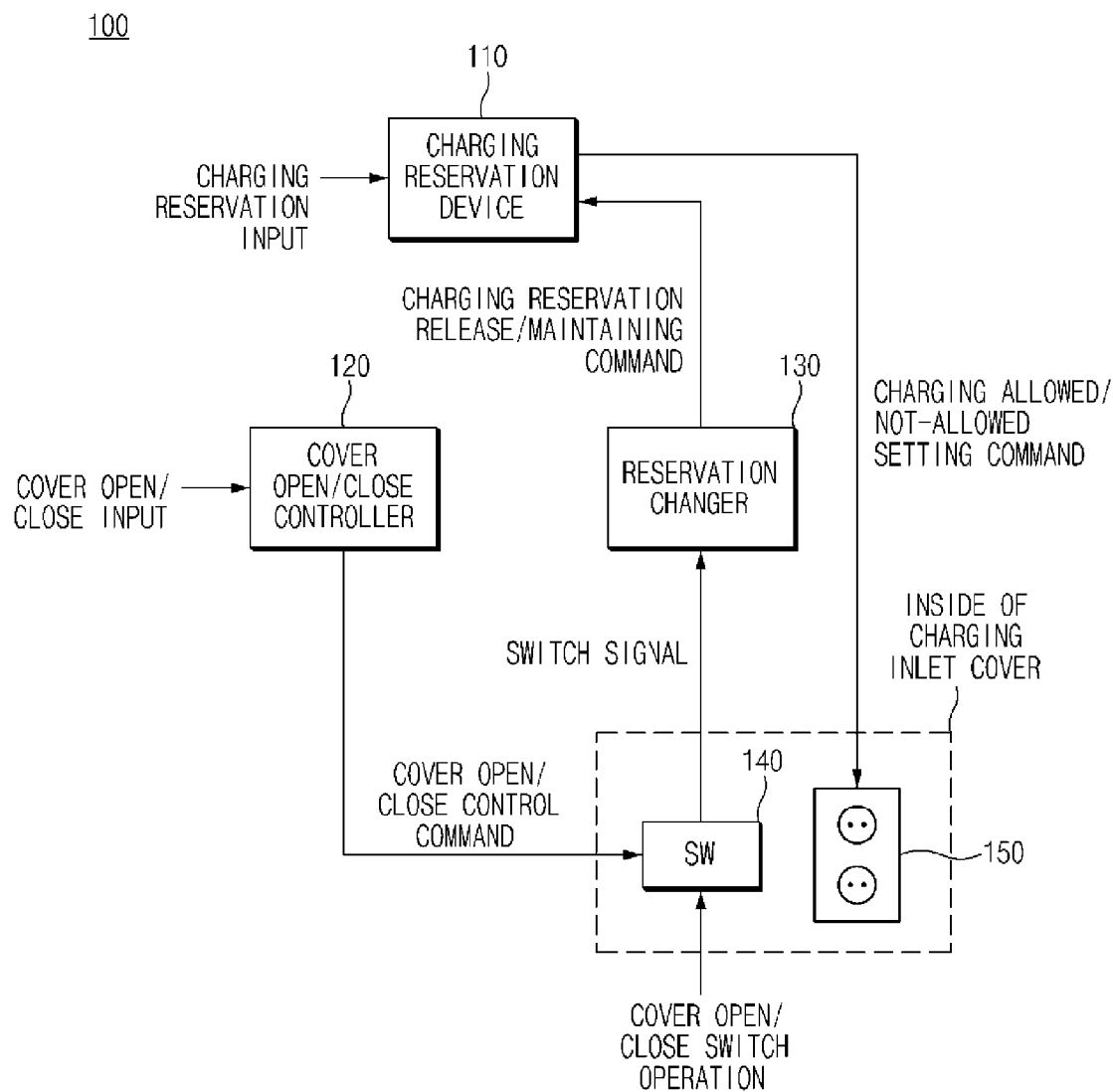
FIG. 1 is an exemplary diagram showing an apparatus for controlling a charge of an electric vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail with reference to the drawings. At this time, in each of the drawings, the same components are denoted by the same reference symbols. Further, detailed descriptions for the previously known features and/or configurations are omitted. In the description below, parts required to understand operations in accordance with various embodiments will be explained in priority, the descriptions for elements, which may obscure the gist of the descriptions, are omitted. It can also be shown schematically some of the elements in the figures are exaggerated or omitted. Not utterly reflect an actual size to the size of each element, so that they are not intended to limit the content that is specified here by the relative size and spacing of the elements drawn in the figure, respectively.

Figure 3A:
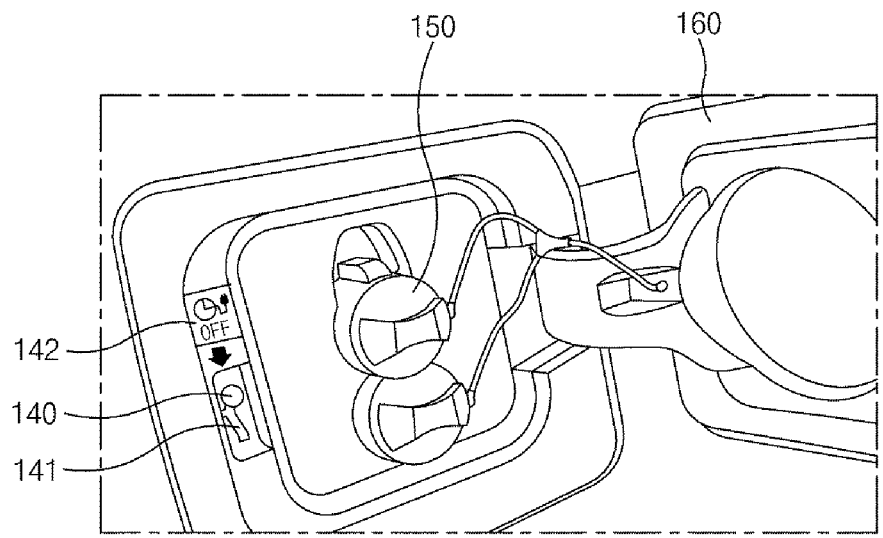
FIGS. 3A and 3B are exemplary diagrams showing surroundings of a charging inlet of an electric vehicle according to an exemplary embodiment of the present invention.
Figure 3B:
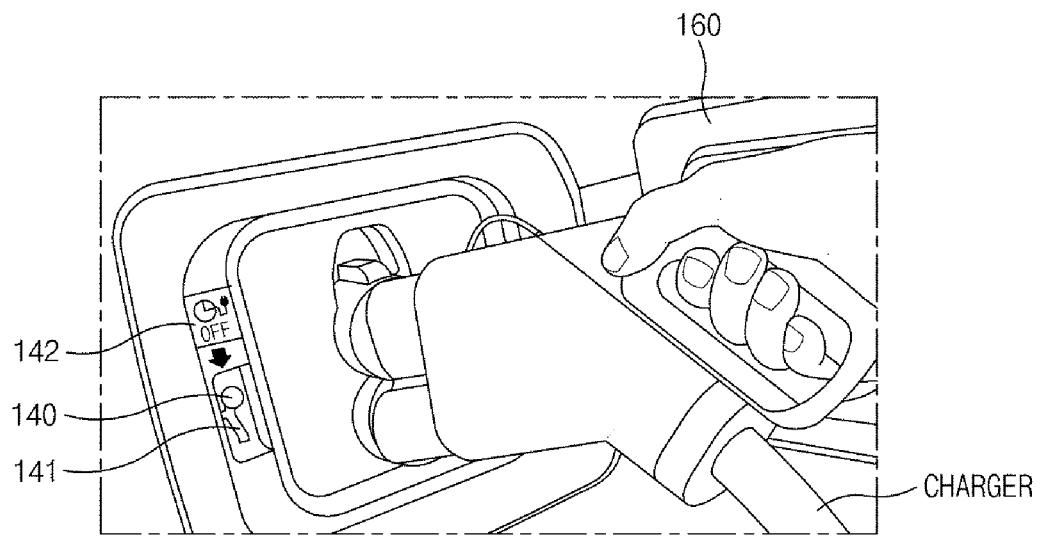

FIG. 1 is an exemplary diagram showing an apparatus for controlling a charge of an electric vehicle according to an exemplary embodiment of the present invention. Referring to FIG. 1, an apparatus 100 for controlling a charging of an electric vehicle according to an exemplary embodiment of the present invention may include: a cover open/close switch 140 configured to execute the open/close of a charging inlet cover (e.g., 160 of FIG. 3), a cover open/close controller 120, and a reservation changer 130 configured to communicate with a charging inlet 150 disposed within the charging inlet cover (see 160 of FIG. 3) of a vehicle. The cover open/close controller may be configured to operate the cover open/close switch and the reservation charger.

In addition, the apparatus 100 may include a charging reservation device 110 configured to execute a charging reservation function. The charging reservation device 110 may be disposed within another controller of the electric vehicle and may be connected with the apparatus 100 for controlling a charge.

The charging reservation device 110, may be configured to switch the charging inlet 150 from a non-charging state to a charging state at a predetermined time (e.g., 1:00 a.m.~6:00 a.m.), and execute the change of the state so as to charge the battery of the electric vehicle using an external charger (see FIG. 3) previously connected to the charging inlet 150. The charging reservation function may be the function that wakes up (e.g., no longer in an idle state) the vehicle by changing a contact of a predetermined switch of the charging inlet 150 based on the control of the charging reservation device 110 at a preset time and starts the charging by the charger. In addition, the charging reservation function may be utilized as a method for reducing a cost of charging a vehicle by performing the charge when electricity costs are less (e.g., about 1:00 a.m. to about 6:00 a.m.)

Alternatively, the cover switch controller 120 may be configured to operate the charging inlet cover (see 160 of FIG. 3) to be opened by separating the charging inlet cover 160 from the cover open/close switch 140. For example, according to the button operation within a vehicle or the screen operation of a terminal (e.g., an electronic device such as a vehicle dedicated terminal or navigation terminal, etc.), the charging inlet cover (see 160 of FIG. 3) may be a cover type which is separated from a fastening part (see 141 of FIG. 3) of a toggle type cover open/close switch 140 to be directly opened. Alternatively, the charging inlet cover may be a type in which when a lock state of the charging inlet cover with vehicle doors is released based on a corresponding operation and the charging inlet cover is separated from the fastening part of the cover open/close switch based on pressing the charging inlet cover by a user.

The reservation changer 130 may be configured to receive the switch signal generated when the user operates the cover open/close switch 140 and generate a release command of the charging reservation of the electric vehicle. Based on the release command, the setting of the charging inlet may be adjusted to the charging state. In particular, the cover open/close switch 140 may include the switch where the fastening part 141 is toggled and the charging inlet cover 160 is opened/closed. The part of the cover open/close switch 140 that corresponds to the operation of the user may be the fastening part 141 itself, or another projection part integrated and combined with the fastening part 141. A predetermined symbol (e.g., an edge bump made to be conveniently pressed, etc.) may be disposed within the user operation part of the cover open/close switch 140. In addition, a simple operation guide 142 may be disposed on the vehicle wall surface around the charging inlet inside the charging cover 160 or the back side of the charging cover 160 and the like.

As the above described, an apparatus 100 for controlling a charge of an electric vehicle may provide a convenient method for an external charger to be connected to the charging inlet 150 by using an intuitive operation of a cover open/close switch 140 and the battery of the vehicle may be charged temporarily in a charging state of the charging inlet 150, even in a charge reservation state.

Figure 2:
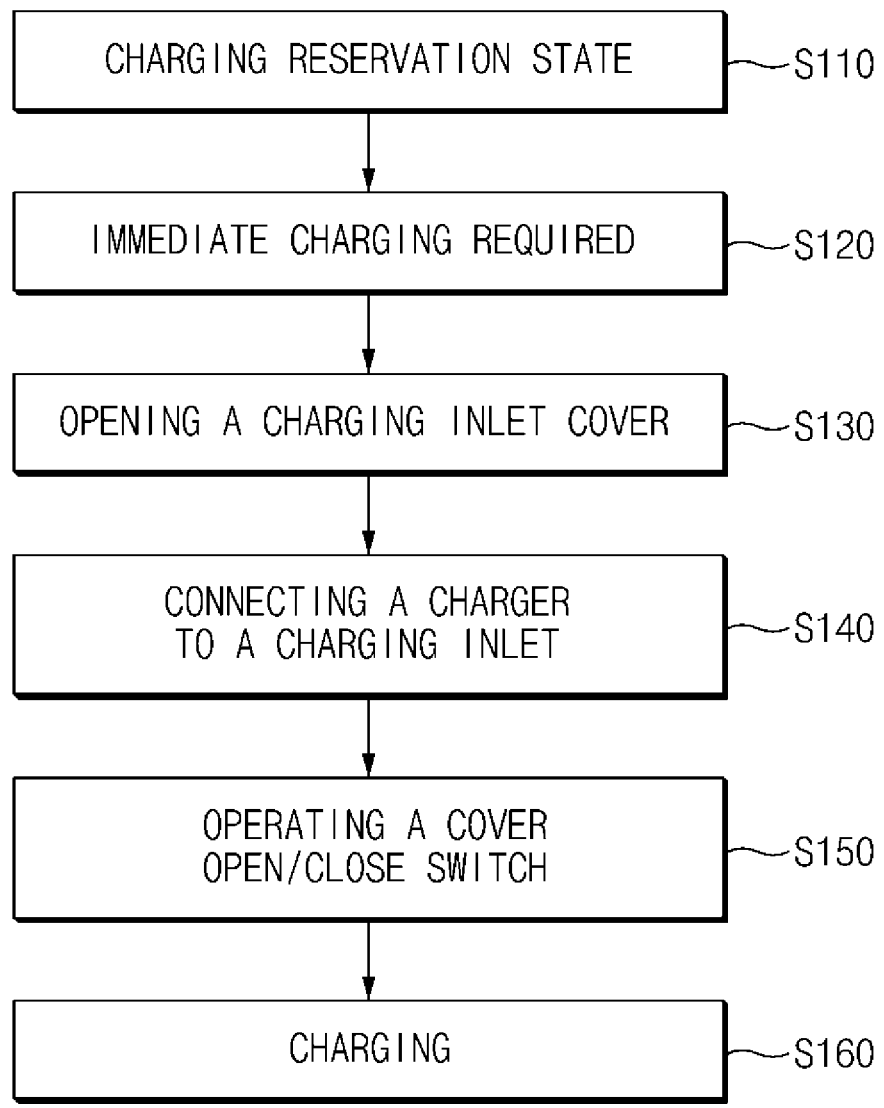
FIG. 2 is an exemplary flow chart showing an operation of an apparatus for controlling a charge of an electric vehicle according to an exemplary embodiment of the present invention.

Hereinafter, with reference to a flow chart of FIG. 2, a method for operating an apparatus 100 for controlling a charge of an electric vehicle will be explained in detail. The method may include: detecting, by a controller, the electric vehicle, which the apparatus 100 for controlling a charge of an electric vehicle may be disposed within, is in the charge reservation state (S110). According to the input for the charge reservation by a user, the reservation device 110 may be configured to perform vehicle charging at a predetermined time (e.g., about 1:00 a.m. to about 6:00 a.m.). Prior to the predetermined time, the charging reservation function may be controlled to cause the charging inlet to be in the non-charging state. Further, when the predetermined time (e.g., about 1:00 a.m. to about 6:00 a.m.) is determined, the charging inlet 150 may be switched from the non-charging state to the charging state, so that the battery of the electric vehicle is charged using an external charger (see FIG. 3) previously connected to the charging inlet 150.

However, a user may need to connect the charger to the electric vehicle and immediately charge the vehicle (S120). Although the user may reserve the charging of the electric vehicle at a predetermined time, when the user requires a charging to use the vehicle in an urgent situation (e.g., working in an office, a business trip to a nearby city) may occur. The present invention may enable simple operation of the cover open/close switch 140, charging the vehicle when the charging reservation function is not set, temporally performing an immediate charge, and when necessary, returning to the original charging reservation state.

When the user requires an immediate charge, a button may be operated within the vehicle or the corresponding menu may be operated within a terminal (e.g., an electronic device such as a vehicle dedicated terminal or navigation terminal, etc.). Based on the button or menu operation, the cover open/close controller 120 may be configured to separate the charging inlet cover 160 from a fastening part 141 of a toggle type cover open/close switch 140 to be directly opened (S130). Alternatively, the cover open/close controller 120 may be configured to release the electronic door lock state of the charging inlet cover (see 160 of FIG. 3).

When the charging inlet 160 is opened, user may connect the charging inlet 150 to the external charger after opening a predetermined protection cap, etc. (S140). In some cases, the charger may already be connected to reserving a charge. A simplified operation guide 142 for the operation of the cover open/close switch 140 may also be included. The simplified operation guide 142 may be included on the back side of the charging inlet cover 160 or a vehicle wall surface around the charging inlet. When immediately charging the vehicle, the charging reservation may be temporally stopped. Further, the operation guide may be manufactured within the vehicle or attached to the vehicle (e.g., as a sticker). The simplified guide indication 142 may assist a user to more simply and intuitively operate the cover open/close switch 140 (S150). Thus, the battery of the electric vehicle may be charged using the charger, and after a charge is completed, the user may remove the charger (S160).

For example, the cover open/close switch 140 may include the toggle-type switch when when the user presses once (e.g., pressure is applied), the switch is on, and when the user presses once again, the switch is off. Alternatively, t the cover open/close switch 140 may generate a predetermined switch signal based on the corresponding method. Accordingly, the reservation changer 130 may be configured to receive the corresponding switch signal and generate the release command for the charging reservation of the electric vehicle. Accordingly, the charging inlet 150 may be changed to the charging state from the non-charging state based on the release command of the charging reservation performed when the charging inlet cover 160 is open.

The release command of the charging reservation by the reservation changer 130 may be directly transmitted to the charging inlet 150 and the setting of the charging inlet 150 may be changed from the non-charging state to the charging state. In addition, the charging reservation device 110 may be configured to receive the release command of the charging reservation by the reservation changer 130. Further, the charging reservation device 110 may be configured to adjust the setting of the charging inlet 150 from the non-charging state to the charging state.

An apparatus 100 for controlling a charge of an electric vehicle may connect the charging inlet 150 to an external charger and temporally charge the battery of the electric vehicle in the charging state of the charging inlet 150 by the operation of the cover open/close switch 140 even in the charging reservation state. After the charge is performed, the vehicle may return to the original charging reservation state, when necessary.

For example, after the charge is performed, the user may change the cover open/close switch 140 once again, and the cover open/close switch 140 may be configured to generate the corresponding switch signal. The reservation changer 130 may be configured to receive the corresponding switch signal and generate a maintaining command of the charging reservation of the electric vehicle. In response to the maintaining command of the charging reservation, the charging inlet 150 may return the setting to the non-charging state directly or by the control of the charging reservation device 110 to maintain the previous charging reservation. When predetermined charging reservation time (for example, 1:00 a.m.~6:00 a.m.) is detected, the charging reservation device 110 may be configured to switch the charging inlet 150 from the non-charging state to the charging state, and execute the state change to charge the battery of the electric vehicle is via the external charger (see FIG. 3) previously connected to the charging inlet 150.

As the above described, according to an apparatus 100 for controlling a charge of an electric vehicle may more simply and conveniently cancel a reservation charging and provide immediate charging via a charger. In addition, since a separate switch for canceling the charging reservation maybe omitted within the vehicle, interior design may be simplified and may not be limited.

In the above description, the present invention has been described through specific elements, exemplary embodiments, and drawings, it is only provided to assist in a comprehensive understanding of the present invention, the present invention is not limited to the exemplary embodiments, and it will be understood by those skilled in the art that the present invention may be implemented as various modifications and variations without departing from the spirit of the present invention. Accordingly, the scope of the present invention is recited in the appended claims, not the above descriptions, and all differences within the equivalent scope of the present invention will be construed as being included in the present invention.

What is claimed is:

1. A method for controlling a charge of an electric vehicle in a non-charging state, comprising:
    generating, by a controller, a release command of a charging reservation based on a switch signal generated by operating a cover open/close switch; and
    changing, by the controller, a setting of a charging inlet to a charging state based on the release command of the charging reservation in a opened state of a charging inlet cover.

2. The method for controlling a charge of an electric vehicle according to claim 1, further comprising:
    temporally charging, by the controller, the battery of the electric vehicle when in a charging reservation state.

3. The method for controlling a charge of an electric vehicle according to claim 1, further comprising:
    generating, by the controller, a maintaining command of the charging reservation based on the switch signal generated by operating the cover open/close switch; and
    returning, by the controller, the setting of the charging inlet to the non-charging state based on the maintaining command of the charging reservation.

4. The method for controlling a charge of an electric vehicle according to claim 1, wherein the cover open/close switch includes a switch that toggles between on or off operation state of the generation of the switch signal or a switch that has a contact position for on or off operation state of the generation of the switch signal based on the operation.

5. The method for controlling a charge of an electric vehicle according to claim 1, wherein the charging inlet cover includes:
    a cover separated from a fastening part of the cover open/close switch and directly opened based on a button operation within the vehicle or a screen operation of a terminal; or
    a cover opened when an electronic door lock state of the charging inlet cover with vehicle doors is released based on a corresponding operation and the charging inlet cover is separated from the fastening part of the cover open/close switch based on pressing the charging inlet cover by a user.

6. The method for controlling a charge of an electric vehicle according to claim 1, wherein in a back side of the charging cover or a vehicle wall surface around the charging inlet inside of the charging cover includes an operation guide for operating the cover open/close switch.

7. An apparatus for controlling a charge of an electric vehicle, comprising:
    a memory configured to store program instructions; and
    a controller configured to execute the program instructions, the program instructions when executed are configured to:
        generate a release command of a charging reservation based on a switch signal generated by operating a cover open/close switch; and
        change a setting of a charging inlet to a charging state based on the release command of the charging reservation in an opened state of a charging inlet cover,
    wherein according to the release command in an opened state of the charging cover, a setting of the charging inlet by the charging reservation is changed from a non-charging state to a charging state.

8. The apparatus for controlling a charge of an electric vehicle according to claim 7, wherein the program instructions when executed are further configured to:
    temporally charge the battery of the electric vehicle when in a charging reservation state.

9. The apparatus for controlling a charge of an electric vehicle according to claim 7, wherein the program instructions when executed are further configured to:
    generate a maintaining command of the charging reservation based on the switch signal generated by operating the cover open/close switch; and
    return the setting of the charging inlet to the non-charging state based on the maintaining command of the charging reservation.

10. The apparatus for controlling a charge of an electric vehicle according to claim 7, wherein the cover open/close switch includes:
    a switch that toggles between on or off operation state of the generation of the switch signal; or
    a switch that has a contact position for on or off operation state of the generation of the switch signal based on the operation.

11. The apparatus for controlling a charge of an electric vehicle according to claim 7, wherein the charging inlet cover includes:
    a cover separated from a fastening part of the cover open/close switch and directly opened based on a button operation within the vehicle or a screen operation of a terminal; or
    a cover opened when an electronic door lock state of the charging inlet cover with vehicle doors is released based on a corresponding operation and the charging inlet cover is separated from the fastening part of the cover open/close switch based on pressing the charging inlet cover by a user.

12. The apparatus for controlling a charge of an electric vehicle according to claim 7, wherein in a back side of the charging cover or a vehicle wall surface around the charging inlet inside of the charging cover includes an operation guide for operating the cover open/close switch.

13. The apparatus for controlling a charge of an electric vehicle according to claim 7, the program instructions when executed are further configured to:
  execute a state change for charging a battery of the electric vehicle using an external charger connected to the charging inlet by switching the setting of the charging inlet from the non-charging state to the charging state, based on an input of the charging reservation.

14. A non-transitory computer readable medium containing program instructions executed by a controller, the computer readable medium comprising:
  program instructions that generate a release command charging reservation based on a switch signal generated by operating a cover open/close switch; and
  program instructions that change a setting of charging inlet to a charging state based on the release command of the charging reservation in an opened state of a charging inlet cover,
  wherein according to the release command in an opened state of the charging cover, a setting of the charging inlet by the charging reservation is changed from a non-charging state to a charging state.

15. The non-transitory computer readable medium of claim 14, further comprising program instructions that temporally charge the battery of the electric vehicle when in a charging reservation state.

16. The non-transitory computer readable medium of claim 14, further comprising:
  program instructions that generate a maintaining command of the charging reservation based on the switch signal generated by operating the cover open/close switch; and
  program instructions that return the setting of the charging inlet to the non-charging state based on the maintaining command of the charging reservation.

17. The non-transitory computer readable medium of claim 14, further comprising:
  program instructions that control a state change for charging a battery of the electric vehicle using an external charger connected to the charging inlet by switching the setting of the charging inlet from the non-charging state to the charging state, based on an input of the charging reservation.

* * * * *